June 9, 1953  R. E. SNYDER  2,641,445
COMBINED ROTARY AND IMPACT DRILL WITH FLUID COUPLING
Filed Nov. 7, 1949
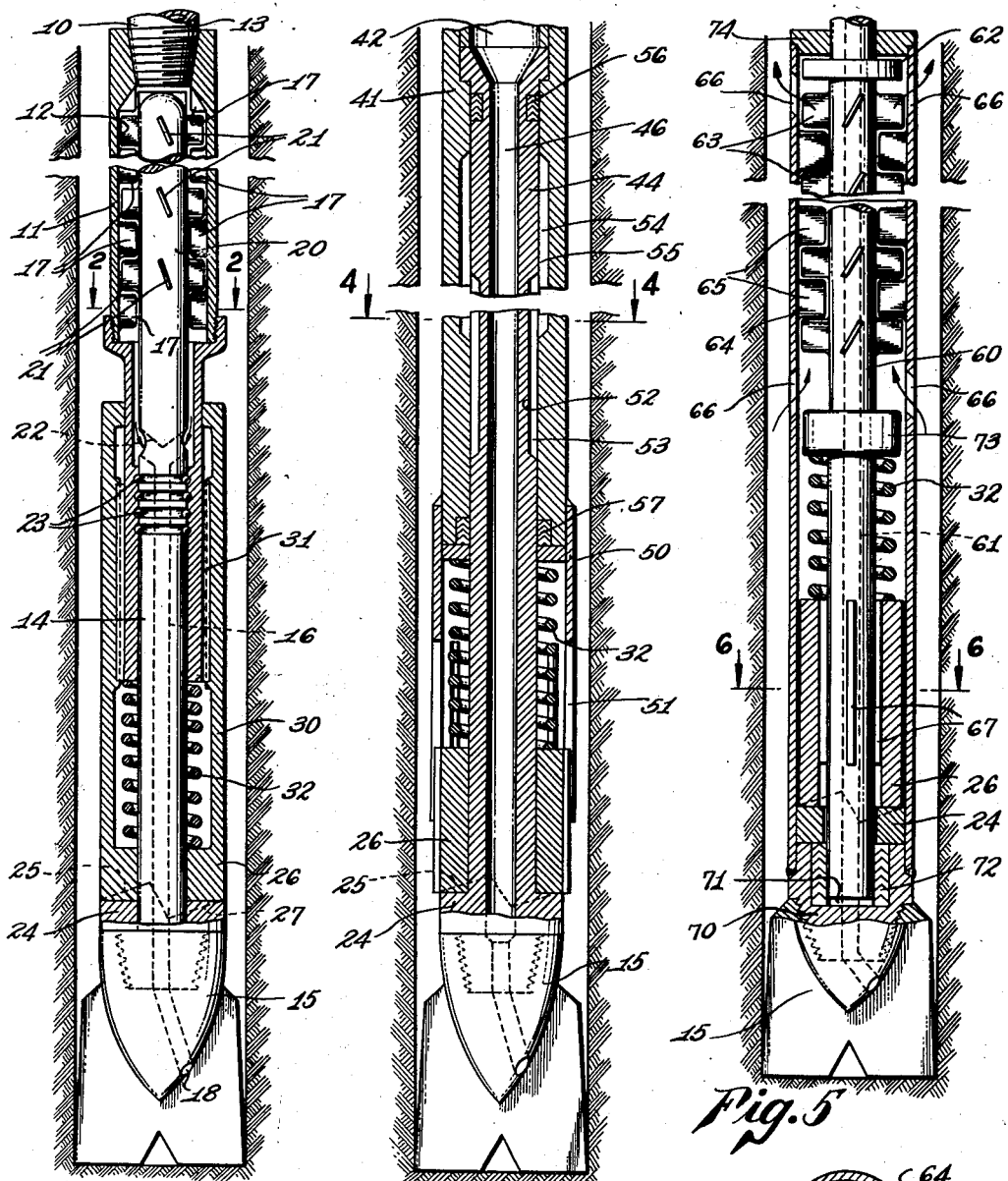
INVENTOR.
ROBERT E. SNYDER
BY
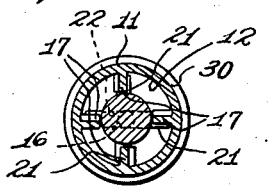
Attorney Patented June 9, 1953

2,641,445

UNITED STATES PATENT OFFICE 2,641,445

COMBINED ROTARY AND IMPACT DRILL WITH FLUID COUPLING

Robert E. Snyder, Los Angeles, Calif., assignor to Snyder Oil Tool Corporation, a corporation of California Application November 7, 1949, Serial No. 125,925

15 Claims. (Cl. 255—3)

My invention relates generally to rotary impact drills and more particularly to such a drill having a fluid coupling between the drill stem and the bit operable to rotate the bit at a speed equal to or different from that of the drill stem. This rotational difference is then used to operate an impact means by converting a portion of the energy into reciprocating movement of a hammer, the remainder of the energy being used to rotate the bit.

In many power transmissions, the inclusion of a fluid coupling presents definite operating advantages. For example, shock loads imposed upon the driven member are not transmitted to the driving member, and other changes in the load conditions may be absorbed by the fluid coupling without overstressing the driving member. Extreme loads may completely stop the driven member, but the slip of the coupling will prevent the stalling of the driving member and the prime mover. This feature has proved to be of great value in the earth drilling art where fluid couplings are becoming more and more popular, being used between the main power unit and the mud pumps, the rotary table, the draw works, etc.

In general, the driven portion of the fluid coupling rotates at a somewhat lower speed than the driving portion, and this difference in speed is termed "slip." The amount of "slip" may vary from zero when no load is applied to the driven member, to a complete or one-hundred per cent (100%) slippage when the driven portion is completely stopped under extreme loads. Because of this "slip," these extreme load conditions may occur without any damage to the prime source of power.

In my invention, I utilize this fluid coupling "slip" or rotational differential to energize a reciprocating hammer rotated by the drill stem to override a cam upon the driven shank carrying the bit and thereby develop impacts in the drill.

It is therefore a major object of my invention to provide a rotary impact drill having a fluid coupling between the drill stem and the bit, with impact producing means actuated by the "slip" or rotational differential between the drill stem and the bit.

It is evident that the total energy in the drill stem is divided between rotation of the bit and the impact thereon; and further, that these two divisions of the energy are interdependent, with ultimate limits of one-hundred per cent (100%) rotation with no impact, and no rotation and one-hundred per cent (100%) impact. In the structures of my invention, I have incorporated positive and controllable means in the fluid drive which may be widely varied to control one of the divisions of energy. The control of one of the energy divisions automatically controls the other. Therefore, another object of my invention is the provision of separate means for each of the energy divisions, i. e., rotation and impact, one of which means is controllable by the driller in order to predetermine the relative distribution of the drill stem energy between rotation and impact at the bit.

Another object of my invention is to provide a drill whose impact producing assembly has a smooth exterior surface that materially contributes to the ease of handling and using the device.

It is a further object of my invention to provide a rotary impact drill of sturdy and rugged construction to withstand the severe conditions of use to which it will be subjected.

Still another object of my invention is to provide a drill whose operation may be easily varied over relatively wide limits after the drill has been lowered to the bottom of the well.

It is a still further object of my invention to provide a drill having these previously mentioned advantages that may be placed in, used, and removed from a well without requiring special training or methods of operation on the part of the operators.

These and other objects and advantages of my invention will become apparent from the following description of several forms thereof and from the drawings illustrating those forms, in which:

Figure 1 is a vertical sectional view of one form of my improved drill as it appears in a well, the bit at the lower end of the drill being shown in elevation;

Figure 2 is a cross-sectional view through a portion of the drill, taken on the line 2—2 in Figure 1;

Figure 3 is a vertical sectional view, similar to Figure 1, of another form of my drill that is particularly adapted to having its operation varied as the drilling progresses;

Figure 4 is a cross-sectional view of the drill shown in Figure 3 and taken on the line 4—4 thereof;

Figure 5 is a vertical-sectional view of a third form of drill operating on the same general principles as the previous forms, but constructed in a slightly different manner; and Figure 6 is a cross-sectional view of the drill shown in Figure 5 and taken on the line 6—6 thereof.

Referring now to the drawings and particularly to Figures 1 and 2 thereof, the numeral 10 indicates generally a drill stem such as is widely known and used in the art of drilling wells. The drill stem 10 is conventionally formed of a series of shorter sections which are suitably joined and held together by coupling members (not shown), and the drill stem is supported at its upper end by means (not shown) such as a rotary table adapted to rotate the stem within the well. At its lower end, the drill stem 10 is coupled in any suitable manner, such as by the well-known pin and box connector, to a housing 11 having an axial passageway 12 therethrough which connects with the conventional axial passage 13 of the drill stem 10. The lower end of the housing 11 is closed by a rotatable shank 14 which in turn is adapted to receive a suitable bit 15, the shank having an axial opening 16 for the passage of drilling fluid or mud therethrough from the passageway 13 to a discharge opening 18 in the bit adjacent the blades of the latter. It will be appreciated, of course, that the use of the rotary drill stem 10, the bit 15, and the circulation of drilling fluid or mud downwardly through the drill stem, out the opening 18, and upwardly around the stem, is conventional practice in the drilling art.

Instead of connecting the bit 15 to the drill stem 10 in the conventional manner to provide a direct mechanical drive between the two, I interpose a fluid drive between the bit 15 and a positively driven member connected to the drill stem 10, thereby providing a difference in rotational speeds between the bit and the drill stem. In the presently described form, this fluid drive includes a plurality of inwardly projecting blades 17 attached to the interior surface of the housing 11 and disposed at an angle to the axis of the latter so that as the housing is rotated by the drill stem 10 in a clockwise direction, as viewed from above, the blades urge the drilling fluid downwardly while rotating the latter. If the drill stem 10 is to be rotated in a counterclockwise direction, the blades 17 are placed at the opposite angle to the axis of the housing 11, but in either case the lower end of the blade trails behind the upper end so that the fluid is forced downwardly as it is rotated.

As seen in the drawing, the inner edges of the blades are located an appreciable distance from the axis of the housing 11, and in the central space formed thereby is a shaft 20 constructed as a continuation of the shank 14. Sufficient clearance is provided between the inner edges of the blades and the shaft 20 so that there is no physical contact between the two under any normal conditions of operation, and the blades 17 are mounted in a series of groups, each group having a plurality of blades mounted on the inner circumference of the housing 11, the blades of one group being axially separated from the blades of the adjoining groups. For convenience in description, the blades 17 are hereinafter referred to as impeller blades, since they are mechanically driven to drive the fluid.

Mounted on the shaft 20 are a series of cooperating blades 21, extending radially outwardly from the shaft and having their outer edges spaced from the inner wall of the housing 11 to provide for their free rotation. Like the impeller blades 17, the blades 21, hereinafter referred to as rotor blades, are mounted at an angle to the axis of the shaft 20 and are grouped so that a plurality of blades are mounted around one circumferential area of the shaft, and the blades of this group are axially spaced from the blades of the adjacent groups. As shown, the rotor blades 21 are axially positioned to lie between adjacent groups of impeller blades 17 so that as fluid travels downwardly through the interior of the housing 11, it first encounters a group of impeller blades which rotate the fluid and urge it downwardly to strike a group of rotor blades 21 and exert a force upon these blades tending to rotate them with the impeller blades. Thereafter, the fluid impinges against another group of impeller blades which direct the fluid downwardly in a rotary manner against the next group of rotor blades, the action being repeated throughout the bladed length of the housing 11.

In addition to the force of the impeller blades upon the fluid, there is the normal force of the pump pushing the fluid mud through the system. This pump pressure also acts as directed by the impeller blades against the rotor blades. It is therefore evident that other arrangements of both the impeller and the rotor blades may be made wherein the rotor will be either driven faster than, equal to or less than the rotational speed of the drill stem. In each case the relation between the impeller blades and the rotor blades forms a resilient fluid coupling between the driving drill stem 10 and the driven shank 14.

The lower end of the shaft 20 continues downwardly to form the shank 14, and one or more holes 22 are formed in the shank to connect to the axial opening 16 for the free flow of drilling mud into the latter from the interior of the housing 11. To hold the shaft 20 and the shank 14 in the proper axial location with respect to the housing 11, bearing means 23 of any convenient type are inserted between the shank and the housing to prevent any axial movement between the two while permitting free rotation therebetween.

In this manner, I have provided a torsionally resilient type of drive for the bit 15 so that the latter is urged to rotate with the drill stem 10, but may rotate at a different speed than the drill stem. While this resilient drive is a definite advantage, the full benefits of my improved drill are achieved when a series of impacts are delivered to the bit 15 as the latter is rotated. As described in my previous patent, No. 2,425,012, issued August 5, 1947, the advantages of rotary impact drilling may be achieved when there are two relatively rotating members upon the drill, and in the present form, these members are found in the housing 11 and the shank 14.

One very suitable method of using the relative rotation just mentioned to provide the desired impacts is to mount a lower cam 24 upon the upper surface of the bit 15 for rotation therewith, the cam having an irregular upper surface 25 similar to that of the lower cam in my previously mentioned patent. Resting upon the lower or anvil cam 24 is an upper or impact cam 26 having a lower cam surface 27 cooperating with the surface 25 of the anvil cam 24 so that clockwise rotation of the upper cam causes the latter to be raised, and then dropped upon the anvil cam to produce an impact which is transmitted to the bit 15.

Extending upwardly from the impact cam 26 is a tubular body 30 which surrounds the shank 14 and at its upper end surrounds the lower portion of the housing 11. At its upper end, the tubular body 30 makes a slidable but relatively close fit with the housing 11, but the remainder of the body is generally spaced from the housing to insure a minimum of frictional resistance between the two.

However, since the tubular body 30 is to rotate with the housing 11, suitable means such as splines 31 are formed on the interior of the body at the upper end thereof to cooperate with corresponding splines formed on the outside of the housing at the lower end thereof. Consequently, the tubular body 30 is free to move axially with respect to the housing 11, while rotating therewith.

As previously mentioned, the lower end of the tubular body 30 is mechanically connected to the upper or impact cam 26 so that the two move together as an integral member, the combined weight of the cam and body normally being sufficient to insure the impact cam resting upon the anvil cam 24 at all times. When it is desired to increase the downwardly directed force of the impact cam 26, a spring 32 bearing against the upper surface of the impact cam and against the lower end of the housing 11 is provided. As indicated in the drawing, the spring 32 surrounds the shank 14, and is so designed as to permit the desired movement of the body 30 while providing the desired downwardly directed force.

*Operation of Figures 1 and 2*

When the drill as shown in Figure 1 is to be operated in the drilling of a well, the entire assembly is attached to the lower end of a drill stem 10 and lowered into the well until the bit 15 reaches the bottom thereof. Thereafter, drilling fluid or mud is forced downwardly through the drill stem 10 and out of the orifice 18 in the manner now customarily used in the drilling art. There will be a certain rotational force applied to the rotor blades 21 by this downward movement of the drilling fluid, but this force may, depending upon the structure of the impeller and rotor blades, be insufficient to rotate the bit 15 when the latter is resting upon the formation at the bottom of the well. However, when the drill stem 10 and the housing 11 are rotated, the additional energy supplied to the drilling fluid by the impeller blades 17 is sufficient to cause the rotor blades 21 to be turned with respect to the walls of the well, thereby rotating the bit, though at a slower speed than that of the drill stem. The actual speed, of course, will be regulated by the force necessary to cause the rotation of the bit, and this in turn will be governed by the characteristics of the formation being drilled, the pressure exerted by the bit against this formation, the quantity and quality of the fluid mud, and the speed of the drill stem.

The more nearly the speed of rotation of the bit 15 approaches that of the drill stem 10, the more slowly the anvil cam 24 will rotate with respect to the impact cam 26. Thus, if the bit 15 should rotate at the same speed as the drill stem 10, there would be no relative rotation between the anvil and impact cams 24 and 26, and there would thus be no impacts delivered to the bit. On the other hand, if the bit 15 were held stationary while the drill stem 10 were rotated, the maximum difference of rotation between the bit and the stem would exist, and the number of impacts delivered to the bit per rotation would be determined by the shape of the cooperating cam faces 25 and 27. Normally, the anvil cam 24 and the impact cam 26 will be constructed with two rise portions and two fall portions so that there will be two impacts per revolution of the cams. It is to be understood that any desired number of impacts may be secured for each revolution of the cams with respect to each other, by the provision of the requisite number of rise and fall portions in a manner obvious to those skilled in the art.

As the drill stem 10 is rotated, the housing 11 is, of course, rotated therewith, as is the tubular body 30. Rotational energy is transmitted from the housing 11 to the shaft 20 through the medium of the blades 17 and 21, this rotational energy being transmitted through the shank 14 to the bit 15. As the bit 15 is driven, the rotational difference between it and the drill stem 10 causes the impact cam 26 to be rotated with respect to the anvil cam 24, raising the impact cam and the body 30 and then releasing them to fall against the anvil cam. The downward movement of the impact cam 26 and body 30 is aided by the helical spring 32, with the splines 31 insuring the rotation of the body with the housing 10 while permitting the free axial movement between the two.

Where the formation being drilled is relatively easily penetrated, the bit 15 will rotate more easily and there will be few if any impacts delivered to it. However, where the formation is difficult to penetrate, the addition of weight from the drill stem to the bit will result in considerable force being required to rotate the bit 15, and consequently the rotational differential between it and the drill stem 10 will be considerably greater. Under the circumstances, a greater number of impacts will be delivered to the bit, thereby materially aiding the latter in its penetration of the formation, and thus increasing the speed of the drilling operation.

*Description of Figures 3 and 4*

In the form shown in Figures 3 and 4, I have used a different type of fluid drive that, while producing the same general types of results, permits the use of a special or different fluid in the fluid coupling other than the drilling fluid or mud previously suggested, and further, provides for varying the power transmitted by the coupling. In this form, I provide a housing 41, comparable to the housing 11 of the previously described form, and connected at its upper end, (not shown) to a drill stem in any convenient and well-known manner. Rotatably mounted within the housing 41 is a shank 44 corresponding to the similar shank 14, and provided with an axially extending passage 46 to convey drilling fluid from an axial passageway 42 in the housing 41, through the shank to a bit 15 mounted on the lower end theeroef and rotated therewith. On the upper surface of the bit 15 I mount an anvil cam 24, and an impact cam 26 surrounds the shank 44 and rests upon the anvil cam in the manner previously described in connection with the first form. A tubular body 50 is connected to the lower end of the housing 41, and the lower end of the body is provided with splines 51 that engage cooperating splines on the upper or impact cam 26 to rotate the latter with the housing 41.

It will be appreciated that the elements of the second form heretofore mentioned correspond and are very similar to correspondingly named elements of the previously described form. A helical spring 32 may be interposed between the lower end of the housing 41 and the upper surface of the impact cam 26 to urge the latter downwardly against the anvil cam 24. Thus, as the housing 41 rotates with respect to the bit 15, the impact cam 26 will override and hit against the anvil cam 24 to produce an impact which is transmitted to the bit, forcing the latter into the formation being drilled.

However, instead of directing the power transmitting fluid downwardly, as in the case of the previously described form, the form shown in Figures 3 and 4 makes use of blades which direct the fluid radially and circumferentially in a series of closed paths, in the general manner of the device shown in the patent to W. T. Eaton, No. 1,739,390. As indicated in Figure 4, the shank 44 is provided with a series of substantially semicircular grooves or recesses 52 to form a plurality of radially outwardly extending rotor blades 53 which extend axially along the shank 44.

Substantially aligned with the recesses 52 are a series of generally semi-circular recesses 54 formed in the inner surface of the housing 41, providing a series of radially inwardly extending blades 55 which may be aligned with the corresponding blades 53 previously mentioned. The total axial length of the grooves 52 and hence the blades 53 is substantially equal to the total axial length of the grooves 54 and the corresponding blades 55 so that it is possible to have the two different sets of blades aligned throughout their entire length. A fluid such as a heavy oil is placed in the grooves 52 and 54 to fill the latter, and thus as the housing 41 is rotated, the fluid in the grooves 54 will be moved with it and transmit rotational energy to the shank 44 in the manner of the well-known fluid clutch.

Since it is not always desirable to transmit the same amount of power to shank 44, I have provided for the relative axial movement of the shank with respect to the housing 41. In this manner, when the shank 44 is moved to its lowermost position, the blades 53 thereof extend into the smooth cylindrical portion of the interior of the housing 41 so that little or no rotational energy is transmitted between this portion of the housing and the shank. Similarly, the upper ends of the blades 55 of the housing 41 surround the smooth outer cylindrical surface of the shank 44 so that in this area there is likewise no transmission of power between the shank and the housing. Consequently, the area of axial alignment of the blades 53 and 55, which constitutes the only portion wherein rotational energy is transmitted from the housing 41 to the shank 44, may be varied at will to control the power delivered to the bit 15.

The alignment of the blades 53 and 54 may be controlled by the adjustment of the axial position of the housing 41, the entire drill being lowered into a well until the bit 15 rests upon the bottom of the well. At this instant, the shank 44 is in its lowermost position with respect to the housing 41 and the least amount of power will be transmitted from the housing to the shank. If the housing is then lowered an additional amount, controlled by the length of the drill stem which is lowered into the well, the housing will move axially downwardly with respect to the shank to provide an increased area of alignment between the blades 53 and 55, thereby increasing the power transmission capabilities of the clutch.

Since the fluid clutch composed of the blades 53 and 55 is provided with its own fluid, it is unnecessary to provide for the entrance and exit of drilling fluid or mud, and in fact the presence of the latter within the hydraulic clutch is undesirable because of the grit and dirt carried thereby. Consequently, I have provided a seal 56 at the upper end of the shank 44 and a corresponding seal 57 at the lower end of the housing 41. These seals may be of any suitable and well-known type adapted to permit the rotation and axial movement of the shank 44 while preventing the passage of fluid thereby.

While the previously mentioned helical spring 32 is not essential to the operation of my improved impact drill, its presence is usually found desirable. It will be seen that as the housing 41 is lowered with respect to the cylindrical plug 44, the spring 32 is compressed to provide a greater impact which is transmitted to the formation being drilled. At the same time, the area of alignment of the blades 53 and 54 is increased so that greater rotational power is transmitted to the bit 15, thereby automatically compensating for the increased pressure with which the bit bears against the formation.

Operation of Figures 3 and 4

When the second form of my drill is to be used, it is lowered into a well in the conventional manner, and the position of the housing 41 with respect to the shank 44 is controlled to provide the desired power transmission between the two. Normally, the drilling fluid or mud will be forced downwardly through the drill string (not shown) before the latter is rotated, but it will be appreciated that because of the complete independence of the fluid clutch from the presence or absence of drilling fluid, the drill may be operated without any drilling fluid in the well. However, successful drilling operation requires the removal of the bits of rock and similar material which are broken off by the bit 15 as it is rotated, and consequently drilling fluid will normally be circulated through the well before any actual drilling is commenced.

As the housing 41 is rotated with respect to the walls of the well, a portion of this rotational energy will be transmitted to the shank 44 to rotate the latter and thus turn the bit 15. If the formation being drilled is relatively soft, the speed differential between the housing 41 and the shank 44 will be relatively small, and consequently the impact cam 26 will rotate and override the anvil cam 24 at a slow rate, thereby producing relatively few impacts per unit of time. As the bit encounters harder material, its speed of rotation will be reduced due to the increased torque required to shear the material free from the pivot structure, and consequently the differential rotation between the housing 41 and shank 44 will be correspondingly increased. Under these circumstances, the impact cam 26 will strike against the anvil cam 24 with greater frequency, thereby driving the bit 15 against the formation and shattering or crushing the latter. If the frequency of impacts becomes too great, the housing 41 is lowered with respect to the shank 44, thereby increasing the rotational force transmitted to the bit 15 so that it rotates more nearly in synchronism with the housing 41, thus decreasing the rate of impacts. Consequently, it will be seen that the operation of this form of my drill may be readily controlled at will by the drilling operator without the necessity of removing the bit from the well to make any necessary adjustments.

Description of Figures 5 and 6

Referring now to the form of my invention shown in Figures 5 and 6, it will be seen that it uses the same general mode of operation as does the form shown in Figures 1 and 2, with the necessary changes to use the drilling fluid after it has been ejected from the drill stem 10 and is passing upwardly through the well on its return to the surface. Consequently, many of the features of operation of the drill shown in Figures 5 and 6 are similar to those of the form shown in Figures 1 and 2.

In this third form of my device, I provide a hollow shaft 60 adapted to be attached at its upper end to a drill stem (not shown) for rotation thereby, the axial passageway 61 of the shaft connecting to the customary passageway of the drill stem to conduct drilling fluid from the stem to the lower end of the shaft. Near its upper end, the shaft 60 is provided with an outwardly extending flange 62 for a purpose hereinafter described, and below this flange I provide a number of groups of radially outwardly extending blades 63, each group of blades including a plurality of individual blades mounted at an angle to the axis of the shaft and spaced around the latter, the blades of one group being spaced axially from the blades of the adjacent groups.

Enclosing the blades 63 is a housing 64 provided at its upper end with an inwardly extending flange or shoulder 74 which rests upon the collar 62 to support the housing in the proper position upon the shaft 60. A number of groups of inwardly extending rotor blades 65 are mounted upon the interior of the housing 64 in a position between the impeller blades 63, the alignment and positioning of the two sets of blades being such that the impeller blades, when rotated in a clockwise direction, will rotate a fluid in that same direction while urging it upwardly, and the rotor blades receive this upwardly directed rotating fluid and are likewise urged in a clockwise direction. It will be recognized that this type of fluid clutch is similar in many respects with the clutch disclosed in Figures 1 and 2, with the exception that where the first described clutch urged the fluid downwardly, the presently described form urges the fluid upwardly. To admit fluid into the housing 64, I provide apertures 66 at the upper and lower ends of the fluid clutch, and while the drilling fluid or mud which is being returned to the surface of the well has a normal upwardly directed flow, it will be realized that the speed of this fluid through the fluid clutch within the housing 64 will be insufficient in and of itself to rotate either the impeller blades 63 or the rotor blades 65. Instead, any rotation of the rotor blades will be caused by the drilling fluid which is rotated and directed upwardly by the impeller blades 63.

At the lower end of the housing 64 I mount an anvil cam 24 which is rotatable with the housing 64, and has an impact cam 26 resting upon its upper surface, the two cams being adapted to rotate with respect to each other and impact together in the manner previously described.

To provide the necessary rotation of the impact cam 26 with respect to the anvil cam 24 the shaft 60 is extended downwardly below the lowermost group of impeller blades 63 and through the impact cam 26, splines 67 being provided to rotate the impact cam with the shaft 60, while permitting the free axial movement of the cam with respect thereto. At its lower end, the housing 64 is provided with a plug 70 having a central recess 71 therein to receive the lower end of the shaft 60 to hold it coaxially with the housing 64 at all times. A sealing member 72 between the plug 70 and the shaft 60 prevents the escape of drilling fluid upwardly between the two while permitting the rotation of the shaft with respect to the plug. A bit 15 is mounted on the plug 70 for rotation therewith, and it will thus be seen that the bit will be rotated by the power transmitted through the fluid clutch to the housing 64. To complete this form of my improved drill, an outwardly extending collar 73 is mounted on the shaft 60 between the lowermost group of impeller blades 63 and the upper end of the impact cam 26, and a helical compression spring 32 extends between the lower surface of the collar and the upper surface of the impact cam to urge the latter downwardly against the anvil cam at all times.

Operation of Figures 5 and 6

When this form of my improved drill is placed within a well, the drilling fluid normally present in such a well will enter the apertures 66 and substantially fill the housing 63, thereby providing fluid for the operation of the hydraulic clutch. Normally, of course, the drilling fluid will be circulating through the drill stem and well at all times when there is any rotation of the bit 15. However, as mentioned, the circulation of this drilling fluid in the well from the mud pump is not necessary for the proper operation of the drill insofar as the rotation and impacting of the latter is concerned.

After the drilling fluid has filled the housing 64, the drill stem (not shown) and the attached shaft 60 is rotated in a clockwise direction, thereby causing the impeller blades 63 to drive the fluid within the housing in a clockwise and upward direction where it impinges upon the rotor blades 65, causing them likewise to rotate in a clockwise direction. It will be appreciated that in this form, as in the previously described forms, there will be a certain amount of frictional engagement between the driving and driven members which will tend to rotate the driven members with the driving members, but this force is normally insufficient to overcome the frictional drag or resistance of the blades of the bit 15 upon the formation being drilled. However, the additional torque or rotational force provided by the fluid clutch including the impeller blades 63 and the rotor blades 65 is sufficient to rotate the bit, though at a lower speed than the shaft 60. Consequently, the anvil cam 24 will lag behind the impact cam 26, causing the relative rotation between these cams which lifts the impact cam and then permits it to drop upon the anvil cam. When the bit 15 is penetrating relatively soft formations, the amount of its weight supported by the bottom of the well will be least, its speed will more nearly equal that of the shaft 60, and there will consequently be relatively few impacts delivered to the bit in any given period of time. However, as the bit 15 encounters harder formation, the amount of its weight supported by the bottom can be made greater to increase its drag on the formation, hence its speed of rotation will be decreased, thereby providing a greater number of impacts. Consequently, the greatest number of impacts per unit time will be delivered where there is the greatest need for them, and thus the greatest efficiency in drilling operations will be secured.

In each of the various forms, the fluid clutch or coupling has been broken intermediate its ends to indicate that the length thereof is greater than may conveniently be shown on a single drawing of this scale. The actual length of the fluid coupling necessary for the successful operation of the drill will depend upon many variables, including the power which must be transmitted to the bit, the rotational speed of the drill stem, the viscosity of the drilling fluid, and the physical dimensions of the various portions of the fluid coupling. In this connection, it should be noted that an increase in diameter of the fluid coupling is much more effective in increasing the transmission of power than is an equal increase in the length of the coupling. Consequently, the diameter of the coupling should be as large as possible with regard to the size of the well into which it is to be inserted.

From the foregoing, it will be seen that I have provided a rotary impact drill having unique operating characteristics. For example, it will be realized that the total power available at the bottom of the well, neglecting frictional losses, is divided into rotative power delivered to the bit, and reciprocating power used to oscillate the hammer. Assuming a constant speed of rotation of the drill stem, as the bit is pressed harder against the formation being drilled, the rotational speed of the bit is decreased and the energy delivered to the hammer or impacting means is increased.

In the structures shown in Figures 1, 3 and 5, the hammer cam is held down against the anvil cam by its own weight and the spring pressure above it. There is thus a fractional resistance against rotation between the cams which is determined by the total force pressing the cams together and the angle of the cams. This resistance to rotation has a definite value which can be predetermined for any particular cam-spring-hammer structure. As long as the difference in torque applied to the cams is less than this critical value, the cams will not override but will rotate together. As soon as this difference in torque applied to the cams is greater than this critical value, the cams will override, and impact of one cam against the other will occur. In all of the structures shown, when the torque applied to the upper or hammer cam is greater than the critical value, the hammer cam will override and impact upon the anvil cam.

Once the cams have started to override, the coefficient of friction between them changes from the relatively high static friction to a lower sliding or kinetic friction. The critical value for continued operation is therefore lower than that necessary to start the override. However, the kinetic friction still serves to drive or drag the anvil cam in the direction of rotation of the hammer cam and thereby rotate the bit.

In the mechanical system shown in each of the above figures the power from the drill stem may be divided between that transmitted through the fluid drive to rotate the bit and that transmitted through the cams to rotate the bit. When the resistance to rotation of the bit, due to increased weight on bottom or any other cause, becomes greater than the torque transmitted by the fluid coupling plus the torque transmitted by the friction between the cams, the bit will lag or rotate with respect to the drill stem. The hammer cam will then override the shank or anvil cam and impact thereon. Thus, part of the drill stem energy will continue to rotate the bit, and the remainder of the drill stem energy will be used to operate the hammer to deliver impact energy to the bit.

In an extreme case, it is theoretically possible to completely stall the bit against all rotation, in which case the full rotational energy of the drill stem would be transmitted into impact energy through the cams. However, from a practical point of view, the rotative torque transmitted by a fluid drive does not decrease greatly as the speed differential increases. This torque, added to the sliding friction of the overriding cams makes complete stalling of the bit very improbable. Also, the impact of the hammer cam upon the anvil cams, being upon a sloping surface as shown in the structures of the above Figures 1, 3 and 5, has a horizontal component in the direction of rotation of the bit. The combination of these three forces, the fluid drive, the sliding friction of the overriding cams, and the rotational component of the cam impact virtually insure that complete stalling of the bit is improbable, and that even though a major portion of the drill stem energy might be diverted into impact energy, the bit would still be rotated in the hole. It should be noted that without the fluid drive or an equivalent positive differential drive, stalling of the bit has proved to be a limiting factor in drill structures where rotation of the bit must be attained solely by drive across the cams.

In the drills described in my previous Patent No. 2,425,012, the rotational power is delivered to the bit directly by the shank. Increased resistance to the rotation of the bit against the structure does not in any way divert power to the impact mechanism. To increase the energy available for producing impacts, it is necessary to increase the speed of rotation of the drill stem until the fluid drag of the retarder blades becomes sufficient to reduce the speed of the hammer with respect to the stem. In said patent the impact energy must be in the form of additional energy supplied by the drill stem. No diversion of energy is possible. In suitable structures embodying the elements of the present invention, the total energy supplied by the drill stem and the mud pump may be divided at the will of the operator, and at any predetermined rotational speed, into any ratio of rotation to impact within the limits of the particular structure.

It will be apparent that various forms of cams, spring systems, fluid couplings, and other components of the device may be used, without departing from the general features of novelty herein defined. Consequently, while I have shown various forms of my improved rotary impact drill, I do not wish to be restricted to the particular form or arrangement of parts herein described and shown, except as limited by my claims.

I claim:

1. A rotary impact drill intended for connection to a rotatable drill stem, which includes: a rotary member adapted to be connected to said drill stem for movement therewith; a bit receiving member; a fluid coupling connected between said rotary member and said bit receiving member to rotate the latter at a speed less than that of said rotary member, whereby relative rotation beween said members is produced; a hammer reciprocably mounted on one of said members to deliver impacts to said bit receiving member; and cam means operatively connected between said relatively rotating members and to said hammer to reciprocate the latter when relative rotation exists between said drill stem and said bit receiving member.

2. A rotary impact drill intended for connection to a rotatable drill stem, which includes: a rotary member adapted to be connected to said drill stem for movement therewith; a bit receiving member adapted to have a rotary impact bit attached thereto; a fluid coupling having a driving member connected to said rotary member and a driven member connected to said bit receiving member to rotate therewith; a hammer connected to said rotary member for rotation therewith and for longitudinal movement with respect to said bit receiving member; and cam means between said hammer and said bit receiving member operable to lift said hammer and then release it to impact against said bit receiving member as said rotary member rotates with respect to said bit receiving member.

3. A rotary impact drill intended for connection to a rotatable drill stem, which includes: a rotary member adapted to be connected to said drill stem for movement therewith; a bit receiving member; a fluid coupling connected between said rotary member and said bit receiving member to rotate the latter at a speed different from that of said rotary member to provide relative rotation between said members; a hammer operatively associated with said rotary member and reciprocably mounted to deliver impacts to said bit receiving member; and cam means connected between said relatively rotating members and to said hammer for reciprocating the said hammer when there is relative rotation between said bit receiving member and said rotary member.

4. A rotary impact drill intended for connection to a rotatable drill stem, which includes: a rotary member adapted to be connected to said stem for rotation therewith; a bit receiving member attached to said rotary member for rotation with respect thereto; an impact producing member connected to said rotary member for longitudinal movement with respect to said bit receiving member; and fluid coupling power dividing means connected to and operable with said rotary member to controllably divide the power supplied thereby between said bit receiving member and said impact producing member.

5. A rotary impact drill intended for connection to a rotatable drill stem, which includes: a rotary member adapted to be connected to said stem for rotation therewith; a bit receiving member attached to said rotary member for rotation with respect thereto and for axial movement therewith; an impact producing member connected to said rotary member for axial movement with respect thereto and for rotational and axial movement with respect to said bit receiving member; and fluid coupling power dividing means connected to and operable with said rotary member to divide the power supplied thereby between said bit receiving member and said impact producing member, whereby said bit receiving member is caused to rotate and said impact member is reciprocated axially of said bit receiving member.

6. A rotary impact drill intended for connection to a rotatable drill stem, which includes: a rotary member adapted to be connected to said drill stem for movement therewith; a bit receiving member adapted to have a rotary impact bit attached thereto; a plurality of impeller blades attached to said rotary member, extending generally radially and axially along said member; a plurality of rotor blades attached to said bit receiving member, extending generally radially and axially along said bit receiving member, said rotor blades and said impeller blades being located alternately with respect to each other so as to form a fluid coupling between said rotary members and said bit receiving member when said blades are immersed in a suitable liquid, whereby said bit receiving member is rotatably driven by and with respect to said rotary member; a hammer connected to said rotary member for rotation therewith and for longitudinal movement with respect thereto; and cam means between said hammer and said bit receiving member to lift said hammer and then release it to impact against said bit receiving member as said rotary member rotates with respect to said bit receiving member.

7. A rotary impact drill intended for connection to a rotatable drill stem, which includes: a rotary member provided with means for connection to said drill stem whereby said member is rotated with said drill stem; a bit receiving member provided with means for connecting a bit thereto for movement with said bit receiving member; a plurality of impeller blades attached to said rotary member, extending generally radially and axially along said member; a plurality of rotor blades attached to said bit receiving member, extending generally radially and axially along said bit receiving member, said rotor blades and said impeller blades being located alternately with respect to each other so as to form a fluid coupling between said rotary member and said bit receiving member when said blades are immersed in a suitable liquid, whereby said bit receiving member is rotatably driven by and with respect to said rotary member; a hammer mounted between said rotary member and said bit receiving member for rotation with and longitudinal movement with respect to said rotary member; cam means mounted on said hammer for movement therewith; and cooperating cam means attached to said bit receiving member for movement therewith, said cam means and said cooperating cam means acting together when relative rotation occurs between said rotary member and said bit receiving member to raise said hammer and then release it to drop downwardly and deliver an impact which is transmitted to said bit.

8. A rotary impact drill intended for connection to a rotatable drill stem, which includes: a rotary member adapted to be connected to said drill stem for movement therewith; a shank adapted to have a rotary impact bit attached thereto; a shaft attached to said shank, extending axially into said rotary member; a plurality of impeller blades attached to said rotary member, extending toward but spaced from said shaft; a plurality of rotor blades attached to said shaft, extending toward but spaced from said rotary member, said rotor and impeller blades being located alternately with respect to each other so that said impeller blades direct fluid against said rotor blades to rotate the latter, thereby forming a fluid coupling; a hammer connected to said rotary member for rotation therewith and longitudinal movement with respect thereto; and cam means between said hammer and said shank to lift said hammer and then release it to impact against said shank as the latter rotates with respect to said rotary member.

9. A drill as described in claim 8, in which said impeller blades are formed in a plurality of groups, each group comprising a plurality of radially extending blades separated axially from the blades of adjacent groups, and said rotor blades are formed in a plurality of groups, each of the latter groups comprising a plurality of radially extending blades separated axially from the blades of adjacent rotor groups, said impeller and rotor blade groups being alternated along the length of said shaft.

10. A rotary impact drill intended for connection to a rotatable drill stem, which includes: a housing having an axial passageway therethrough, adapted to be connected to said drill stem for rotation therewith; a co-axial shaft mounted in said housing for rotation with respect thereto; a plurality of groups of radially inwardly extending impeller blades mounted in said housing, each of said groups having a plurality of circumferentially spaced blades and the blades of one group being axially spaced from the blades of adjacent groups; a plurality of radially outwardly extending rotor blades mounted on said shaft each of said groups having a plurality of circumferentially spaced blades, and the blades of one group being axially spaced from the blades of adjacent groups, said groups of impeller and rotor blades being alternated along the axes of said shaft and housing so that fluid entering said housing is given an axial and rotational movement to transmit rotary power from said impeller blades to said rotor blades; a shank closing the lower end of said housing and connected to said shaft for rotation therewith, said shank having an axial passageway therethrough connecting to the interior of said housing; a bit receiving member mounted on the lower end of said shank for rotation therewith; a hammer connected to said housing for rotation therewith and axial movement with respect thereto; cam means mounted on said hammer for movement therewith; and cooperating cam means mounted on said bit receiving member for movement therewith, said cam means and said cooperating cam means acting together when relative rotation occurs therebetween to raise said hammer and then release it to drop downwardly and deliver an impact which is transmitted to said bit.

11. A rotary impact drill intended for connection to a rotatable drill stem, which includes: a hollow shaft adapted to be connected to said drill stem for rotation therewith; a bit receiving member adapted to have a rotary impact bit attached thereto; a housing attached to said bit receiving member, coaxial with said shaft and surrounding the latter; a plurality of impeller blades attached to said shaft, extending toward but spaced from said housing; a plurality of rotor blades attached to said housing, extending toward but spaced from said shaft, said rotor and impeller blades being located alternately with respect to each other so that said impeller blades direct fluid against said rotor blades to rotate the latter, thereby forming a fluid coupling; a hammer connected to said shaft for rotation therewith and longitudinal movement with respect thereto; and cam means between said hammer and said bit receiving member to lift said hammer and then release it to impact against said bit receiving member as the latter rotates with respect to said shaft.

12. A drill as described in claim 11 in which said impeller blades are formed in a plurality of groups, each group comprising a plurality of radially extending blades separated axially from the blades of adjacent groups, and said rotor blades are formed in a plurality of groups, each of the latter groups comprising a plurality of radially extending blades separated axially from the blades of adjacent rotor groups, said impeller and rotor blade groups being alternated along the length of said shaft.

13. A rotary impact drill intended for connection to a rotatable drill stem, which includes: a shaft having an axial passageway therethrough, adapted to be connected to said drill stem for rotation therewith; a coaxial housing mounted on said shaft for rotation with respect thereto; a plurality of groups of radially inwardly extending rotor blades mounted in said housing, each of said groups having a plurality of circumferentially spaced blades, and the blades of one group being axially spaced from the blades of adjacent groups; a plurality of radially outwardly extending impeller blades mounted on said shaft, each of said groups having a plurality of circumferentially spaced blades, and the blades of one group being axially spaced from the blades of adjacent groups, said groups of impeller and rotor blades being alternated along the axis of said shaft and housing so that fluid entering said housing is given an axial and rotational movement to transmit rotary power from said impeller blades to said rotor blades; a bit receiving member connected to the lower end of said housing for rotation therewith, having a central recess therein to receive the lower end of said shaft; sealing means preventing the escape of fluid between said shaft and said bit receiving means while relative rotation occurs therebetween; a hammer connected to said shaft for rotation therewith and axial movement with respect thereto; cam means mounted on said hammer for movement therewith; and cooperating cam means mounted on said bit receiving member for movement therewith, said cam means and said cooperating cam means acting together when relative rotation occurs therebetween to raise said hammer and then release it to drop downwardly and deliver an impact which is transmitted to said bit.

14. A rotary impact drill intended for connection to a rotatable drill stem, which includes: a rotary member adapted to be connected to said drill stem for axial and rotational movement therewith; a shank adapted to have a rotary impact bit attached thereto, said shank being connected to said rotary member for rotational and limited axial movement with respect thereto; a plurality of axially extending generally radial impeller blades attached to said rotary member for movement therewith; a plurality of axially extending generally radial rotor blades attached to said shank for movement therewith, said impeller blades being substantially the same length as said rotor blades, and both sets of blades being so located that they are in substantially complete axial alignment when said rotary and bit receiving members are in one position with respect to each other, and are in less complete alignment when said members are in other axial positions with respect to each other, whereby a fluid coupling is formed whose torque transmitting capacity may be varied by axially shifting the position of said rotary member with respect to said shank; a hammer connected to said rotary member for rotation therewith and longitudinal movement with respect thereto; and cam means between said hammer and said bit receiving member to lift said hammer and then release it to impact against said shank as the latter rotates with respect to said rotary member.

15. A rotary impact drill intended for connection to a rotatable drill stem, which includes: a housing having an axial passageway therethrough, adapted to be connected to said drill stem for movement therewith; a coaxial shaft within said housing having an axial passageway therethrough, said shaft being capable of rotational and limited axial movement with respect to said housing; a plurality of axially extending generally radial impeller blades projecting inwardly from said housing toward said shaft but clearing the latter; a plurality of axially extending generally radial rotor blades projecting outwardly from said shaft toward said housing but clearing said housing and said impeller blades, said impeller and rotor blades being so positioned with respect to each other as to cooperate to form a fluid coupling for the transmission of rotary power from said rotary member to said shaft, said impeller and rotor blades being axially shiftable with respect to each other as said shaft and said housing are axially moved with respect to each other, whereby the power transmission characteristics of said fluid coupling may be varied; sealing means between said shaft and said housing to prevent the escape of fluid from said coupling though said shaft and said housing move with respect to each other; a bit receiving member attached to the lower end of said shaft for movement therewith; a hammer mounted on said shaft for axial and rotational movement with respect thereto, connected to said housing for rotation therewith and axial movement with respect thereto; cam means connected to said hammer for movement therewith; and cooperating cam means connected to said bit receiving member for movement therewith, said cam means and said cooperating cam means acting together when relative rotation occurs therebetween to raise said hammer and then release it to drop downwardly and deliver an impact which is transmitted to said bit.

ROBERT E. SNYDER.

References Cited in the file of this patent

UNITED STATES PATENTS

| Number | Name | Date |
|---|---|---|
| 1,482,702 | Scharpenberg | Feb. 5, 1924 |
| 1,572,972 | Tabb | Feb. 16, 1926 |
| 1,607,082 | Howcott | Nov. 16, 1926 |
| 1,739,390 | Eaton | Dec. 10, 1929 |
| 1,785,086 | Hauk | Dec. 16, 1930 |
| 2,002,629 | Cobb et al. | May 28, 1935 |
| 2,167,019 | Yost | July 25, 1939 |
| 2,228,482 | Prebensen | Jan. 14, 1941 |
| 2,287,157 | Wolff | June 23, 1942 |
| 2,425,012 | Snyder | Aug. 5, 1947 |

FOREIGN PATENTS

| Number | Country | Date |
|---|---|---|
| 671,684 | France | Sept. 7, 1929 |
| 780,441 | France | Jan. 29, 1935 |